May 31, 1966  E. S. POSGATE  3,253,712
FILTER SYSTEMS

Filed Feb. 20, 1964  6 Sheets-Sheet 1

INVENTOR
EDWARD SALMON POSGATE
BY
Busser, Smith & Harding
ATTORNEYS

May 31, 1966 E. S. POSGATE 3,253,712
FILTER SYSTEMS
Filed Feb. 20, 1964 6 Sheets-Sheet 5

Fig. 8.

INVENTOR
EDWARD SALMON POSGATE
BY
Busser, Smith & Harding
ATTORNEYS

May 31, 1966 E. S. POSGATE 3,253,712
FILTER SYSTEMS
Filed Feb. 20, 1964 6 Sheets-Sheet 6

FIG. 9.

INVENTOR.
EDWARD SALMON POSGATE
BY
Busser, Smith & Harding
ATTORNEYS

United States Patent Office 3,253,712
Patented May 31, 1966

3,253,712
FILTER SYSTEMS
Edward Salmon Posgate, Toronto, Ontario, Canada, assignor to De Laval Turbine Inc., Trenton, N.J., a corporation of Delaware
Filed Feb. 20, 1964, Ser. No. 346,220
Claims priority, application Great Britain, Feb. 1, 1961, 3,794/61
8 Claims. (Cl. 210—136)

This application is a continuation-in-part of my copending application Serial Number 167,714, now abandoned, filed January 22, 1962.

This invention is for improvements in or relating to a filter system and more particularly to a filter system in which diatomaceous earth is employed as the filtering medium and which is particularly suitable in connection with the following industries: bottle washing plant, breweries, cattle watering, chemical works, dairies, distilleries, dyeing and bleaching plant, electro-plating baths, jam factories, laundries, mineral waters, oil refineries and storage, paint manufacture, pharmaceutical products, quenching and tempering, radioactive products, settling tanks, soap manufacture, sprinkler system tanks, sterilizing equipment, sugar refineries, swimming pools, textiles, water storage and aviation.

According to the present invention there is provided a filter system which comprises means through which liquid is withdrawn from a contained quantity thereof and returned through a filter of diatomaceous earth to the said contained quantity and means operable simultaneously with the withdrawal of the said liquid from the said contained quantity of liquid for causing the flow of the liquid through the filter of diatomaceous earth to be reversed.

Further according to the present invention there is provided a filter system which comprises means for withdrawing liquid from a contained quantity thereof and passing the same continuously in one direction from the said means towards a filter of diatomaceous earth and means disposed between the said withdrawing means and the filter of diatomaceous earth operable simultaneously with the continuous withdrawal of the said liquid from the contained quantity of liquid to reverse the flow direction so that in one direction it passes through the diatomaceous earth and septum and in the reverse direction it separates the diatomaceous earth from the septum or support media.

Again according to the present invention there is provided a filter system, employing diatomaceous earth as the filtering medium, for a contained quantity of liquid which comprises an outlet, an inlet, and a conduit forming a direct connection between the said outlet and inlet, means for transferring liquid from said outlet to said inlet, a drain connected between the said inlet and outlet which when open permits the flow of liquid simultaneously from both the inlet and the outlet to the drain.

Another feature of the invention is the provision of a filter system of the indicated type in which an eductor is used as a distributing component for effecting flow of liquid either to the filter for filtering or flow from the filter for removing the filter cake from the filtering element.

Another feature of the invention is the provision of a filter-separator unit for filtering and for the separation of water from fuels, oils or the like. The filter-separator unit in accordance with the invention is a permanent type and does not involve the use of disposable elements. Moreover, the filter separator in accordance with this invention incorporates the method of flow reversal hereinbefore described.

The invention will be more particularly described with reference to the accompanying drawings in which.

The filter system according to this invention can comprise either a manually or an automatically regulatable system and for the purpose of illustration only, and not by means of limitation, two manually and one automatically regulatable system will be hereinafter described.

Figure 1:
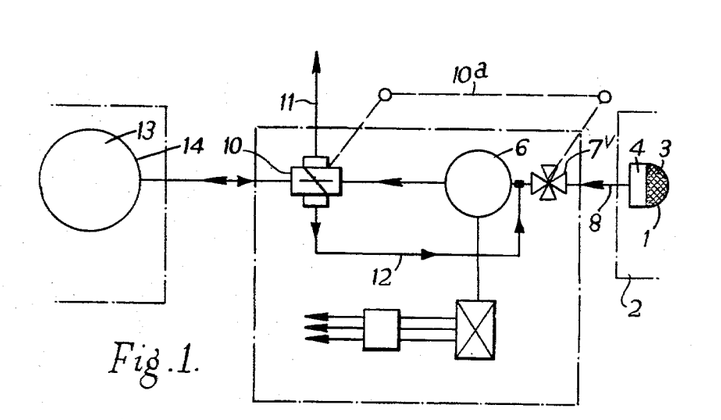
FIGURE 1 illustrates a manually regulatable method of carrying the invention into effect.

Referring to FIGURE 1 of the drawings there is illustrated a manually regulatable filtering system constructed in accordance with the present invention which consists primarily of an inlet 1 mounted below the level of a contained quantity of liquid, for example, below the level of the water at the shallow end of a swimming pool 2. The inlet 1 is preferably provided with a gauze screen or sleeve 3 which ensures that floating matter, for example, leaves on the surface of the contained liquid is not fed through the said inlet. The inlet 1 is arranged in communication with a receptacle 4 designed to receive a predetermined quantity of diatomaceous earth. The receptacle 4 is connected to a pump 6 operable to draw liquid from a contained quantity thereof through the inlet 1, and the receptacle 4 containing the diatomaceous earth and feed through a conduit 8 a quantity of diatomaceous earth to a valve 7v.

The direction of flow of the liquid from the valve 7v (FIGURE 1) is controlled by a device 10 operable by means 10a which in one position permits the liquid to flow only to a filter 13, or in an alternative position permits the liquid to flow from filter 13, through line 12 and the pump suction to a drain 11 which runs to waste.

Figure 8:
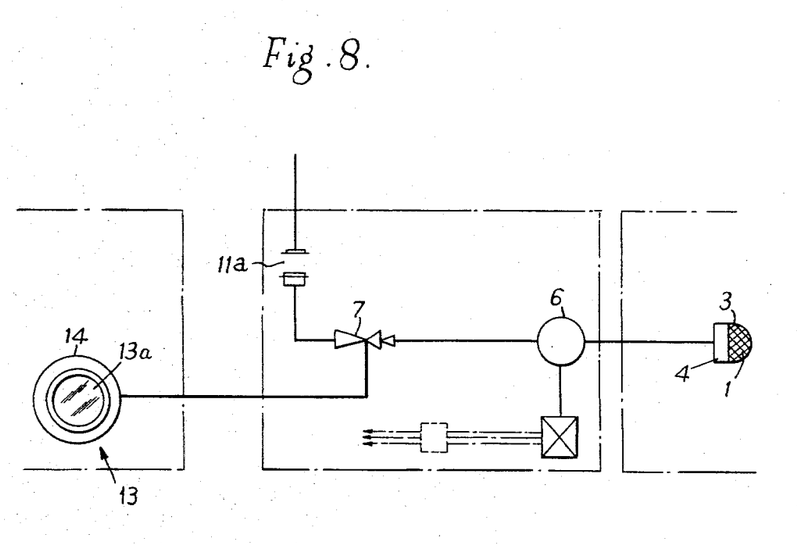
FIGURE 8 illustrates a modification of the method illustrated in FIGURE 1 in which an eductor comprises a venturi.

Referring to the modified arrangement illustrated in FIGURE 8, it will be observed that the pump 6 is connected between the receptacle 4 and the eductor 7.

Figure 3:
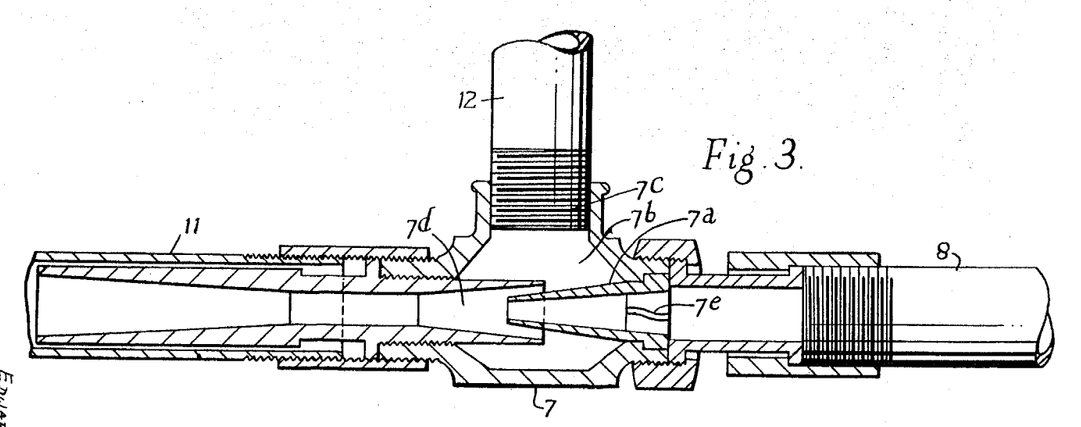
FIGURE 3 illustrates an eductor in the form of a venturi operable to effect the control of the liquid to be filtered according to the present invention.

The eductor suitable for use in carrying the invention into effect in the manner illustrated in FIGURE 8, is illustrated in FIGURE 3 wherein the inlet conduit 8 is connected to a frustro conical inlet 7a which extends into a three way throat 7b from which extend connections 7c and 7d. The conical inlet 7a is provided with a curved vane 7e which adds considerably to the efficiency of the venturi.

Figure 4:
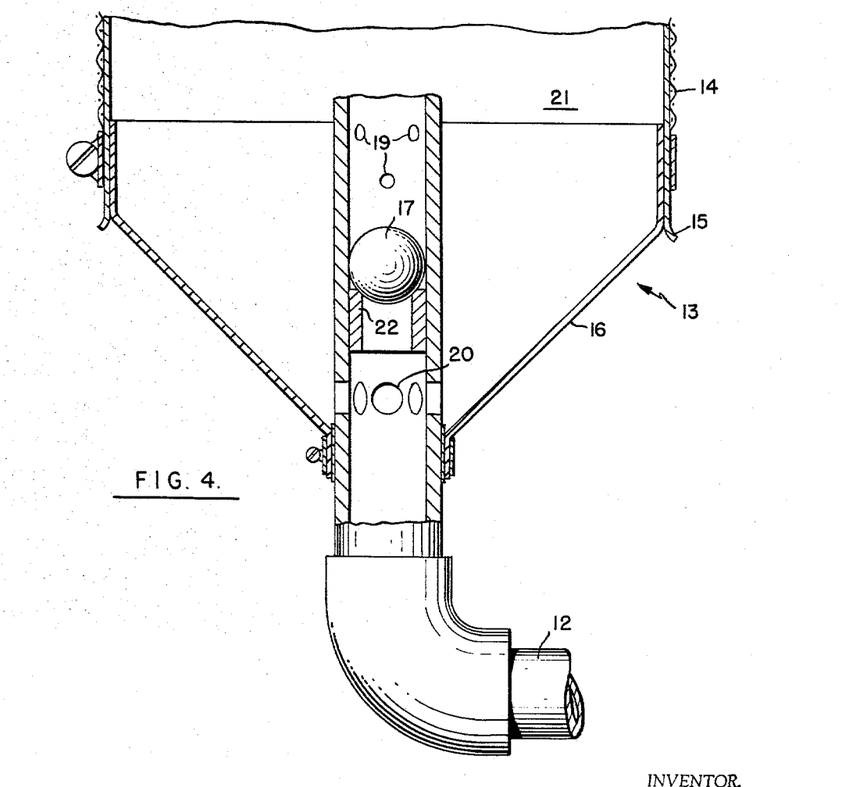
FIGURE 4 illustrates partly in section the lower end of a filter operable to effect the filtration of liquid in accordance with the invention.

The filter 13 (FIGURES 4 and 5) comprises a coarse mesh screen 14 enclosing a synthetic or metal filter cloth 15, the screen and cloth being clamped to the frame of the filter by suitable means. The filter 13 is provided at the lower end thereof with a conical extension 16 (FIGURE 4). Extension 16 is secured, by means of a suitable clamp at a cylindrical portion thereof, to a tubular distributing member 18 which is centrally located and has a plurality of liquid distributing ports 19 therein extending through its length. Distributing member 18 is connected to the conduit 12 and is provided internally with a ball check valve member 17 cooperable with a cylindrical valve seat member 22. The valve member 17 and valve seat 22 serve as an inlet check valve for the filter. The inlet check valve is positioned between the distributing ports 19 and the inlet to the filter and serves to block flow from the filter chamber 21 through the distributing ports 19 outwardly of the filter. The inlet check valve will permit flow into the filter past the valve seat member 22, through the distributing passages 19 and into the filter chamber since flow into the filter under pressure will raise the valve member 17 to the top of the distributing member 18. At the lower end of the filter the distributing member 18 is provided with a plurality of passages 20 located between the inlet check valve and the inlet connection of the filter. This construction provides flow communication between the filter chamber 21 and the filter inlet connection for bypassing the inlet check valve. If, for any reason, the pressure from the pump is reversed to provide a suction in the conduit 12 connecting the pump to the lower end of the filter 13, the valve 17 closes the lower end of the cylindrical distributing member 18 and connects the conduit 12 through holes 20 to the chamber 21. Upon a decrease in pressure in the conduit 12 to effect reversal of flow, the valve 17 will fall to block flow past the valve seat 22 whereby the flow will be through holes 20 so that diatomaceous earth will fall away from the filter cloth and pass through holes 20 to an exhaust which is provided on the conduit 12.

Figure 5:
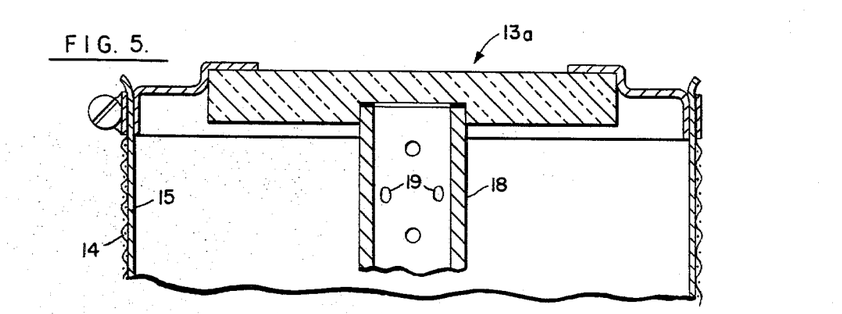
FIGURE 5 illustrates partly in section on an enlarged scale the upper portion of the filter illustrated in FIGURE 4.
Figures 6, 7:
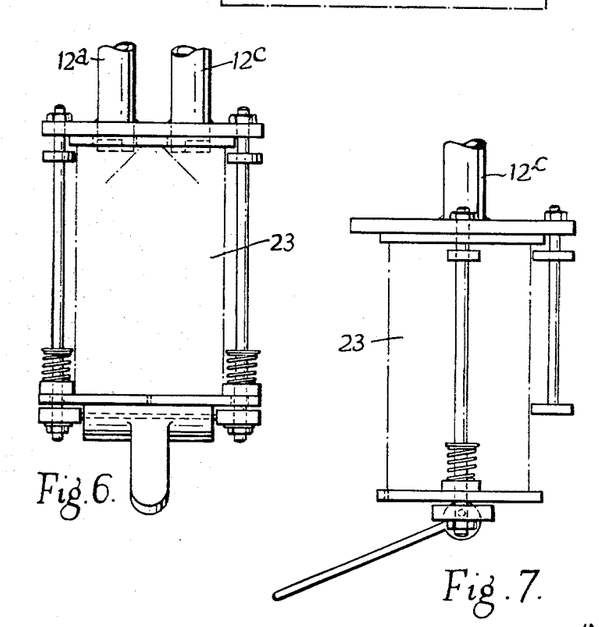
FIGURES 6 and 7 illustrate means for extracting diatomaceous material from a container.

Filter 13 is provided with an optical window 13a in the top of the filter construction. Window 13a permits good observation by an operator of the internal condition of the filter.

In order to operate the manually regulatable system described with reference to FIGURE 8, diatomaceous earth is fed into the receptacle 4 and the motor of the pump 6 is set in operation having first ensured that the conduit leading from the venturi 7 to the waste drain is sealed by closing the valve or disconnecting a self-sealing coupling 11a. The liquid under such circumstances together with the diatomaceous earth passes through the eductor 7 to the filter 13 raising the valve member 17 (FIGURE 4) so as to enable the liquid charged with diatomaceous earth to pass through the perforations 19 of the perforated cylindrical member 18 and on to the inner surface 15 of the filter cloth formed of a synthetic or metal filter cloth. The diatomaceous earth cakes upon the said filter cloth 15 and thereafter filters liquids which are pumped through the system with the result that any foreign matter is completely removed from the liquid thus ensuring that the contained quantity of liquid is always completely clear.

When it is desired to renew the diatomaceous earth in the filter 13 the conduit from the eductor to waste drain is opened with the result that a suction is produced between the filter 13 and the eductor 7 causing the diatomaceous earth in the filter to be drawn away from the filter cloth 15.

The condition of the filter can be observed by providing a pressure gauge near the eductor 7 which will indicate when the diatomaceous earth is no longer performing with complete efficiency and further, when the diatomaceous earth in the filter is being removed by the method hereinbefore described, an optical window 13a enables the operator to view the internal condition of the filter 13.

The above system which is extremely simple in its construction and operation can be regulated automatically by substituting for the diatomaceous earth feed receptacle at the inlet a device for feeding diatomaceous earth to the filter which consists of inserting in the conduits which connect the eductor 7 to the filter 13 a mechanism which is operable to puncture a receptacle 23 filled with diatomaceous earth and connect an inlet junction 12c and outlet junction 12a thereof to the conduit 12. The arrangement is such that when the system is set in operation, the diatomaceous earth will be washed out of the receptacle 23 into the filter 13 whereupon the system is set for operation substantially in the manner hereinbefore described with reference to the manual operation but obviating the necessity of the operator handling the diatomaceous earth.

Such a system can be operated automatically by being provided with an electrically operated valve 10 (for example, a solenoid operated valve or a motorized valve) between the eductor and the waste pipe 11 and with an automatically operable visual device 24 for determining when the filter has reached the point where the desired efficiency has been exceeded.

If so desired the whole control mechanism can be contained in a housing separate from the contained quantity of liquid and connectable thereto by conduits which are provided with readily removable attachments.

The system hereinbefore described can be rendered completely automatic by the provision of a pressure switch 26 (FIGURE 2) which is controlled by the liquid passing through the diatomaceous earth. Unlike the manual system the filter in the automatic system need not actually be located in the pool (FIGURE 2), but is located in a filter well. Filtered water enters the pool through a small hole which provides velocity. The jet of water creates movement in the pool thus preventing static pockets of water. As the pressure of the liquid passing through the diatomaceous earth reaches a predetermined value, the pressure switch 26 is adapted to operate and cause the direction of flow of the liquid to be reversed for a predetermined period, whereupon a reduction in pressure of the liquid caused by the diatomaceous earth being slightly loosened and re-deposited by the reversal of flow of the liquid, the switch 26 will close and the liquid will be caused to flow through the filter in the filtering direction thereof.

Such an arrangement, it will be observed, permits the same diatomaceous earth to be used periodically over a longer period than would be the case if after the pressure of the liquid through the filter has reached a predetermined maximum, the diatomaceous earth was expelled to waste.

In addition to the above, the filter can be provided with a screen 3' so that individuals entering the contained quantity of liquid, in for instance, a swimming pool, cannot interfere with the surface of the filter.

In such an arrangement, the housing merely requires three conduits, one conduit 12' being connected to the filter 13 submerged in the contained quantity of liquid, another conduit 1' being connected to the inlet of the contained quantity of liquid and the third conduit 8' being connected through the eductor to a waste pipe 11. In this manner the whole device can be operated by the single actuation of a pressure control switch 26 which will determine whether the device is providing filtered liquid to the contained quantity or whether the device is operating so as to clean the filter of used diatomaceous earth.

A master switch located in a control box actuates the system, which operates automatically and continuously when the switch is switched on. A pressure switch coupled to a sequence timer controls the complete cycle of operations which are divided into the three following nominal stages: precoating, filtration, and backwashing.

*Precoating.*—For a preset time the diatomaceous earth is fed at a high speed by the powder feeder to a slurry tank where it mixes with the incoming pool water. The centrifugal pump delivers the water and powder to the immersed filter where the precoat is formed on the internal surface of the filter.

*Filtration.*—After the precoat is complete the powder feeder starts to operate at a very slow rate, delivering a low slurry concentration through the pump to the filter element. The filter cycle will continue until the pressure in the pump discharge line reaches the same as that preset on the pressure switch.

*Backwashing.*—When the pressure switch closes the following functions occur:

(a) The sequence timer resets to zero.
(b) The automatic powder feeder stops.
(c) The solenoid valve 10 opens and flow through the filter is reversed causing the disintegrating cake to be siphoned to the drain.
(d) After the preset backwash time is complete solenoid valve 10 closes causing reverse flow again through the immersed filter. At the same time the powder feeder commences fast operation for precoating.
(e) After the preset precoating time has elapsed powder feeder switches to a relatively slow speed for slurry feeding.
(f) Filtration continues until once again the pressure switch operates at the preset pressure thereof, when operation becomes the same as at a.

The cycle of automatic operations will continue indefinitely until the system is switched off. On restarting it will always commence with backwashing even in the case of power failure. This is to ensure that the filter is completely cleaned and precoated before the filtration cycle begins.

A float valve in the slurry tank maintains the water at the required level automatically during the sequence of operations.

The powder feeder 4a has a signal when it requires recharging with diatomaceous earth, and it is preset to give sufficient advance warning.

Turbidity is monitored by a simple transistorized light intensity detector which controls through a relay the pump and motor revolutions per minute. This provides very long filter cycles and operating economy since pool turnover rate is proportional to the degree of turbidity. When the number of bathers is large, or if for some other reason turbidity increases, the pump and motor r.p.m. becomes higher proportionally. This shortens the turnover rate and maintains the pool water at maximum clarity. Conversely low turbidity requires only a longer pool turnover rate and since the complete system is governed by the light intensity detector less power and diatomaceous earth is required. The lower the pump revolutions per minute, the less pressure will be imposed upon the cake. In this case it will not pack hard and cause a rapid increase in differential pressure.

Figure 2:
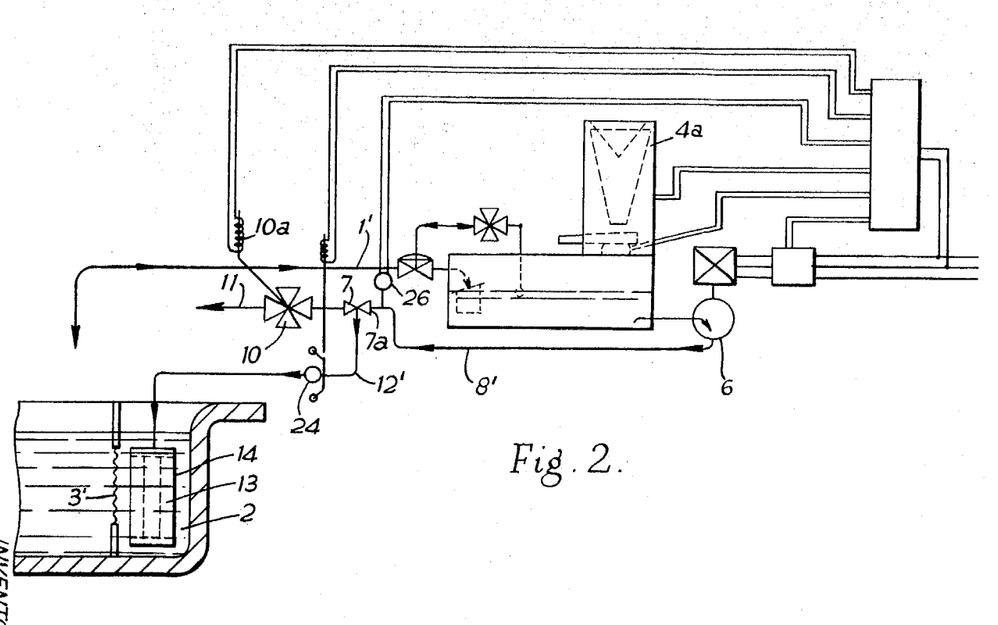
FIGURE 2 illustrates diagrammatically an automatically regulatable method of carrying the invention into effect embodying the essential characteristics of the invention illustrated in FIGURE 1 and FIGURE 8.

The filter system according to FIGURE 2 illustrates the feature of the invention relating to the use of an eductor as a distributing component for the liquid in either of two directions. Eductors, which are also known in the art as ejectors, are normally used for exhausting a fluid by entraining it in a high velocity stream which is passed through the eductor from a supply line to a discharge line, a suction line providing communication between the fluid to be exhausted and the high velocity stream. In accordance with the present invention, there is provided a flow controlling valve 10 in the discharge line 11 of the eductor 7 and the suction line 12 is connected to the inlet side of the filter 13. The eductor supply line 8 is connected to the discharge of the pump 6 and the eductor discharge line 11 is connected to waste. The control valve 10 is movable to a pair of flow controlling positions to either open or close the discharge line 11. When the valve 10 is in the open position, the pump 6 delivers liquid through the line 8 and eductor 7 to the line 11 whereby a suction is created in line 12. This is the usual mode of operation of an eductor. In accordance with this operation, the eductor operates to exhaust fluid and filter cake from the inlet side of the filter 13 as discussed above. When the valve 10 is closed to block flow through the eductor discharge line 11, the liquid delivered to the eductor from pump 6 by way of line 8 is forced to flow through the suction line 12 to the filter 13. In this condition of the filter system, filtering takes place as discussed above. It will be evident that in the above-described arrangement the eductor may be used either to drain liquid from the filter or to deliver liquid to the filter, the operation being dependent upon the positioning of the valve in the eductor discharge line.

The filter system according to FIGURE 8 also illustrates the feature of the invention relating to the use of an eductor as a distributing component for the liquid to be treated. It will be apparent that the system shown in FIGURE 8 may involve the use of a manually operable control valve instead of the coupling means 11a, in which case the position of the valve controls flow through the eductor to either the filter or the waste line as discussed above. A further modification to the system shown in FIGURE 8 which makes the system more simple in operation would be to construct the receptacle 4 of a cylindrical screen adapted to receive a cartridge of diatomaceous earth of a premeasured size. By this construction it is a simple matter to replace the supply of diatomaceous earth.

Figure 9:
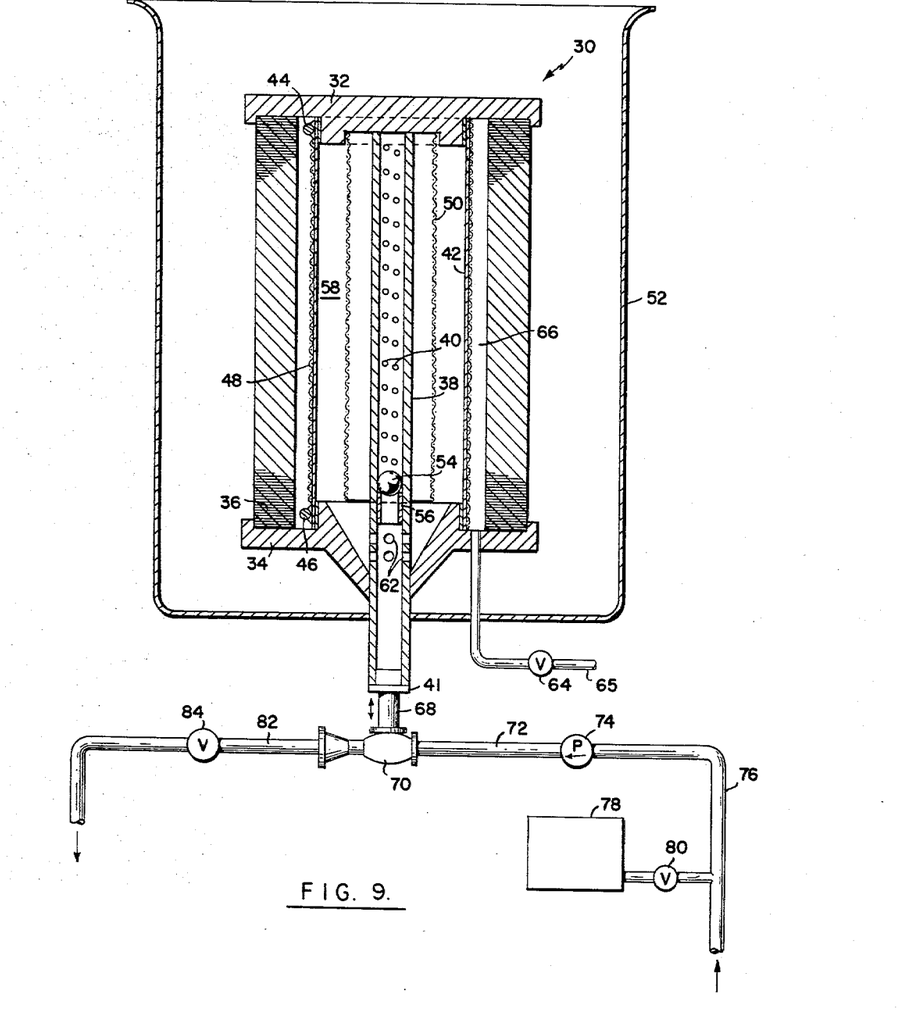
FIGURE 9 illustrates a filter/separator device in accordance with the invention.

The device disclosed in FIGURE 9 for separating water and solids from a liquid incorporates various of the above-discussed features of the invention in addition to other features and comprises a cylindrical vessel indicated generally at 30. The vessel 30 includes upper and lower end plates 32 and 34, respectively, having a plurality of stacked annular Fiberglas discs 36 supported in compression therebetween. The stacked discs 36 form laminated cylindrical coalescing medium which will be described more fully hereafter. Lower end plate 34 is secured to a tubular distributing member 38 which is centrally located and has a plurality of liquid distributing ports 40 therein extending throughout its length. Contained within the cylinder provided by the discs 36 is a cylindrical filter element 42 consisting of a filter cloth extending between the end plates 32 and 34 and clamped thereto by means of clamps 44 and 46, respectively. The filter cloth may be of any suitable material such as metal or synthetics. A backing member 48 in the form of a coarse mesh metallic screen is mounted externally of the filter element 42 to provide added strength and prevent outward bulging of the filter element during filtering. A cylindrical fine mesh screen 50 is mounted on the upper end plate 32 to extend downwardly and enclose the distributing member 38.

The lower end of the distributing member 38 is provided with an inlet connection 41 for the vessel and this lower end projects through the bottom of a suitable tank 52 in which the vessel 30 is positioned. This arrangement is merely illustrative and, of course, other suitable containers may be provided for the vessel 30, such as a conventional pressure vessel, or a plurality of vessels 30 may be mounted on a common plate which cooperates with a conical extension communicating with the suction of a single eductor. Distributing member 38 is provided with an inlet check valve comprising a ball valve member 54 and a cylindrical valve seat member 56. The inlet check valve is positioned between the distributing ports 40 and the inlet connection 41 to block flow from a chamber 58, which is located between the distributing member 38 and the filter element 42, through the distributing ports 40 to the inlet connection 41. The inlet check valve will permit flow through the inlet connection 41, past the valve seat 56, through the distributing passages 40 and into chamber 58 since flow through the inlet connection under pressure will raise the valve member 54 to the top of the distributing member 38.

The lower end plate 34 is provided with a conical central portion in opposed relation with a plurality of passages 62 in the distributing member 38, which passages 62 are located between the inlet check valve and the inlet connection 41. This construction provides flow communication between the inlet connection 41 and the chamber 58 bypassing the inlet check valve. A bypass valve 64 and line 65 is provided for the flow of liquid from an annular chamber 66, which is located between filter element 42 and the stacked discs 36, to the exterior of tank 52. Line 65 may be used for the removal by vacuum of solids which may accumulate in small amounts in chamber 66.

A line 68 connects the inlet connection 41 to the suction of an eductor 70 of the venturi type described previously. A supply line 72 for the eductor is connected to the discharge end of a pump 74. The inlet end of pump 74 is connected to a storage tank (not shown) for the liquid to be processed by means of a line 76. A filter aid slurry tank 78 containing a supply of diatomaceous earth or another suitable filter aid is connected to line 76 through a flow regulating valve 80. The discharge end of eductor 70 is connected by a line 82 containing a control valve 84 to a drain or a recovery vessel. By this arrangement, the eductor 70 serves as a distributing component for the liquid either to the filter-separator unit or to waste as described previously.

The filter-separator device in accordance with this invention is particularly suitable for the filtering and separation of water from fuels used in aircraft and jet engines, breweries, chemical plants and oil refineries. The device is capable of removing from the fuel particles as small as about $\frac{1}{10}$ to $\frac{1}{2}$ micron. Moreover, the device may be operated to remove 100 percent of the particles over a predetermined size.

In describing the operation of the filter-separator, let it be assumed that the apparatus is set for filtration and water separation. In this operative condition, the valve 84 is closed and the pump 74 is in operation to pump the liquid to be processed from the storage tank through lines 76 and 72 to the eductor 70. Since flow through the discharge of the eductor 70 is blocked by valve 84, the liquid passes out the suction connection thereof and through line 68 and inlet connection 41 to the distributing member 38 of the vessel 30. The liquid entering the bottom of the distributing member raises the valve member 54 to the top of the distributing member 38 and liquid flows outwardly through the distributing ports 40 into the chamber 58. The fine screen 50 causes the velocity of the liquid being expelled through the distributing ports 40, to be evenly distributed or reduced. When diatomaceous earth is delivered to the liquid from the slurry tank, it forms a coating on filter element 42, in a manner well known in the art. Because screen 50 causes the velocity to be reduced, the coating deposited on the filter element 42 is uniform. Without screen 50 the velocity of the liquid leaving ports 40 would cause the cake to erode and vary in thickness. Screen 50 is particularly necessary when vessel 30 is of small diameter. Recirculation of the liquid to form the coating of diatomaceous earth on the interior of the filter element 42 is not necessary, but there is involved the usual body feed filter aid technique. This diatomaceous earth coating serves to filter out solid materials contained in the liquid being processed as it passes through the filter element 42 into the chamber 66.

The liquid then passes from chamber 66 outwardly through the laminated disc element 36 which serves as a coalescing medium. If the liquid being processed contains any fine droplets of water suspended therein, these droplets will be coalesced or united into large globules of water as they pass through the Fiberglas compressed disc cylinder. Other coalescing mediums that would be satisfactory are those comprising graphite-bonded Fiberglas elements, ceramic or sintered stainless steel. When these large globules of water reach the outside surface of the coalescing medium, they precipitate and accumulate into a large volume of water. If the vessel 30 is contained in a conventional pressure vessel, and oil contaminated by finely dispersed water is to be processed, the separated water will accumulate at the bottom of the pressure vessel by reason of the differences in specific gravity. The water may then be removed by suitable means.

When it is desired to clean the unit for any reason, such as an excessive accumulation of filter cake on the filter element 42, the valve 84 is opened. Accordingly, the liquid delivered to the eductor inlet by pump 74 will pass straight through the venturi thereof to the eductor discharge communicating with line 82. The liquid passing through line 82 and open valve 84 is delivered to a drain or recovery vessel. This high velocity flow of liquid through the eductor 70 creates a suction in the line 68 whereby the liquid contained within vessel 30 is drawn into the eductor 70 and delivered to the drain or recovery vessel. By reason of the suction applied to the inlet of the vessel 30, there is a reversal of flow whereby liquid passes from chamber 66 through filter element 42 into chamber 58. Moreover, the filter cake on the interior of filter element 42 becomes dislodged therefrom and passes into the liquid in chamber 58.

When this reverse flow occurs, the valve member 54 descends onto the valve seat 56 to block flow through the inlet check valve. Accordingly, the filter cake containing liquid in chamber 58 must leave the vessel through passages 62 and thereby bypass the inlet check valve. The purpose of this bypass flow arrangement is to insure that all of the diatomaceous earth is removed from the filter element and the vessel. With the check valve closed, the diatomaceous earth containing liquid in chamber 58 will not flow through the distributing ports 40 but instead will flow through the relatively larger passages 62. Thus, there will be less chance of the diatomaceous earth clogging the small distributing ports 40 or accumulating in the interior of distributing member 38. This clogging is further minimized by the screen 50 which tends to block the diatomaceous earth from coming into contact with the exterior of the distributing member 38 during the reverse flow.

After the liquid and the filter cake are removed from the vessel, and it is desired to re-establish filtering, the valve member 84 is closed. Accordingly, the liquid delivered from the pump is directed through the eductor 70 into the vessel 30 as described above. The diatomaceous earth coating on the filter element may then be re-established by the rapid precoating technique as is well known in the art.

The two stage filter-separator apparatus in accordance with the invention is an improvement over the present disposal type units in use today. By using a diatomaceous earth filter in the first stage, the liquid can be clarified to a very high degree. Moreover, the second stage filter comprising the coalescing medium will last almost indefinitely since its function is limited to that of removing water only and it does not have to perform any filtration function, in other words, the use of the first stage diatomaceous earth filter serves to provide a very efficient filtering action and at the same time protect the coalescing element. Furthermore, by reason of the arrangement for replenishing the diatomaceous earth filter there is provided a permanent type of filter separator unit.

Thus it will be seen that according to the present invention there is provided a filter system which is adaptable to a considerable number of industries, is simple in its operation and is comparatively cheap in its production.

It will be apparent that various changes may be made in the construction and arrangement of parts without departing from the scope of the invention. It is thus not desired to be limited except as set forth in the following claims.

What is claimed is:

1. A filter system for a contained quantity of liquid comprising a filter vessel including a filter element defining an inlet chamber in said vessel on the inlet side of said filter element, the outlet side of said filter element being in communication with said contained quantity of liquid, flow distributing means including an eductor having an inlet connection, an outlet connection and a suction connection, first conduit means connected between said filter inlet chamber and the suction connection of said eductor, second conduit means connected to said outlet connection of said eductor, and valve means in said second conduit movable between open and closed positions for controlling flow through said second conduit, means including a pump withdrawing liquid from said contained quantity of liquid and delivering it under pressure to said eductor inlet connection whereby said liquid is directed by said distributing means to flow to said filter through said first conduit means in one direction when said valve means is closed and to flow between said eductor inlet and outlet connections when said valve means is open to draw liquid from said filter through said first conduit means in a direction opposite said one direction, and means for supplying filter aid to said means for withdrawing liquid from said contained quantity of liquid for delivery to said distributing means to form a coating of filter aid on the inlet side of said filter element.

2. A filter system according to claim 1 wherein said filter aid is diatomaceous earth which is positioned in the path of flow of the liquid from said contained quantity to said distributing means.

3. A filter system according to claim 1 wherein said filter vessel is submerged within said contained quantity of liquid.

4. A filter system according to claim 3 wherein said filter aid supply is contained within a receptacle which is submerged within said contained quantity of liquid.

5. A filtering and water separating system comprising a vessel having a tubular water coalescing medium defining the exterior of the vessel, a tubular filter element within said coalescing medium, and an inlet connection in communication with the interior of said filter element, an eductor having an inlet connection, an outlet connection and a suction connection, a first conduit means connected between the filter inlet connection and the suction connection of said eductor, means including a pump for delivering the liquid to be treated to the inlet connection of said eductor under pressure, second conduit means connected to said outlet of said eductor, and valve means in said second conduit means movable between open and closed positions for controlling flow through said second conduit whereby liquid is directed to flow through said first conduit means into said filter when said valve means is closed and is directed to flow between said eductor inlet and outlet connections when said valve means is open to draw liquid from said filter through said first conduit means, said eductor and said second conduit means.

6. A system according to claim 5 including means for supplying filter aid to said liquid delivering means for forming a filter aid coating on the inlet side of said filter element.

7. A filtering and water separating ssytem comprising a vessel having a vertically extending tubular water coalescing medium the outer wall of which defines the exterior of the vessel, a vertically extending tubular filter element within said coalescing medium, and an inlet connection in communication with the inerior of said filter element, means including a pump for delivering liquid to be treated under pressure to said inlet connection whereby said liquid flows through said filter element and then through said coalescing medium to the outer wall thereof, means for supplying a filter aid to said liquid delivering means for forming a filter aid coating on the inlet side of said filter element, a flow distributing tube within said vessel extending vertically within said filter element and arranged to receive flow from said inlet connection into the interior of the tube, said flow distributing tube having a plurality of vertically spaced flow distributing ports extending radially therethrough, and a tubular fine mesh wire screen for reducing flow velocity within said filter element and surrounding said flow distributing tube, throughout the extent of said distributing ports, said screen being spaced radially from and substantially centrally between said flow distributing tube and said filter element.

8. A filtering and water separating system comprising a vessel having a vertically extending tubular water coalescing medium the outer wall of which defines the exterior of the vessel, a vertically extending tubular filter element within said coalescing medium, and an inlet connection in communication with the interior of said filter element, means including a pump for delivering liquid to be treated under pressure to said inlet connection whereby said liquid flows through said filter element and then through said coalescing medium to the outer wall thereof, means for supplying a filter aid to said liquid delivering means for forming a filter aid coating on the inlet side of said filter element, a flow distributing tube within said vessel extending vertically within said filter element and arranged to receive flow from said inlet connection into the interior of the tube, said flow distributing tube having a plurality of vertically spaced flow distributing ports extending radially therethrough, a tubular screen within said filter element and surrounding said flow distributing tube, said screen being spaced radially from said flow distributing tube and said filter element, and a check valve within said flow distributing tube for limiting flow in the upward direction through the interior of said tube, and a bypass flow passage means in said tube below said check valve providing a passage for flow into and out of said tube at a location below said check valve.

References Cited by the Examiner

UNITED STATES PATENTS

| | | | |
|---|---|---|---|
| 343,251 | 6/1886 | Neracher | 210—425 |
| 870,631 | 11/1907 | Kneuper | 210—193 |
| 1,601,503 | 9/1926 | Munro | 210—315 X |
| 2,087,775 | 7/1937 | Matthews | 210—193 X |
| 2,270,924 | 1/1942 | Blair | 210—108 |
| 2,336,112 | 12/1944 | Jokel | 210—108 X |
| 2,480,108 | 8/1949 | Barker | 210—130 |
| 2,523,793 | 9/1950 | Vance | 210—193 |
| 2,570,131 | 10/1951 | Koupal | 210—193 X |
| 2,657,808 | 11/1953 | Mankin | 210—315 |
| 2,887,228 | 5/1959 | Marlan | 210—108 |
| 3,143,139 | 8/1964 | Pretti | 210—425 |

FOREIGN PATENTS 777,001   6/1957   Great Britain.

REUBEN FRIEDMAN, *Primary Examiner.*

R. HALPER, *Assistant Examiner.*